United States Patent
Kwan

(10) Patent No.: US 7,075,914 B2
(45) Date of Patent: Jul. 11, 2006

(54) SOFTWARE MODEM ARCHITECTURE

(75) Inventor: Dennis Kwan, San Diego, CA (US)

(73) Assignee: Microtune (San Diego), Inc., San Diego, CA (US)

( * ) Notice: Subject to any disclaimer, the term of this patent is extended or adjusted under 35 U.S.C. 154(b) by 879 days.

(21) Appl. No.: 09/851,734

(22) Filed: May 8, 2001

(65) Prior Publication Data

US 2001/0055281 A1    Dec. 27, 2001

Related U.S. Application Data

(60) Provisional application No. 60/202,734, filed on May 8, 2000.

(51) Int. Cl.
*H04Q 7/24* (2006.01)
(52) U.S. Cl. .................. 370/338; 370/469
(58) Field of Classification Search ........ 370/280, 370/293, 352–356, 390, 395.4, 465–469
See application file for complete search history.

(56) References Cited

U.S. PATENT DOCUMENTS

| | | | |
|---|---|---|---|
| 5,778,059 A | | 7/1998 | Loghmani et al. |
| 5,911,041 A | | 6/1999 | Schaffer |
| 5,953,741 A | * | 9/1999 | Evoy et al. .............. 711/132 |
| 6,243,778 B1 | * | 6/2001 | Fung et al. .............. 710/113 |
| 6,321,366 B1 | * | 11/2001 | Tseng et al. .............. 716/6 |
| 6,427,178 B1 | * | 7/2002 | Collin et al. .............. 710/33 |
| 6,449,292 B1 | * | 9/2002 | Weeber .............. 370/517 |
| 6,526,066 B1 | * | 2/2003 | Weaver .............. 370/465 |
| 6,766,383 B1 | * | 7/2004 | Pan et al. .............. 710/22 |
| 2002/0025832 A1 | * | 2/2002 | Durian et al. .............. 455/556 |
| 2003/0161296 A1 | * | 8/2003 | Butler et al. .............. 370/352 |

FOREIGN PATENT DOCUMENTS

WO    WO 00/16534    3/2000

OTHER PUBLICATIONS

International Search Report.
PCT Search Report PCT/US 01/14930; dated Aug. 7, 2002.
Wolfram Hardt; "An Automated Approach to HW/SW-Codesign"; XP-002197757; no date given.

* cited by examiner

Primary Examiner—Chau Nguyen
Assistant Examiner—Rhonda Murphy
(74) Attorney, Agent, or Firm—Baker Botts L.L.P.

(57) ABSTRACT

A system is described comprising: a finite state machine having a plurality of states interconnected through a plurality of events, wherein certain states and events in said plurality are implemented in software and other states and events in said plurality are implemented in hardware; and a scheduler communicatively coupled to the finite state machine and being programmable with one or more parameters defining scheduled operations to be performed by the scheduler, wherein the finite state machine is configured to select one or more of said parameters to be used by said scheduler upon transition by said finite state machine from a first state to a second state.

12 Claims, 10 Drawing Sheets

LOOK-UP TABLE
400

| Current State | Event | Action | Next State |
|---|---|---|---|
| 301 | 310 | A | 302 |
| 302 | 311 | B | 305 |
| 303 | 317 | C | 301 |
|  | 315 | D | 304 |
| 304 | 314 | E | 305 |
| 305 | 316 | F | 301 |
|  | 312 | G | 306 |
| 306 | 318 | H | 307 |
| 307 | 313 | I | 304 |

FIG. 4

SOFTWARE MODEM ARCHITECTURE

PRIORITY

This application claims the benefit of U.S. Provisional Application No. 60/202,734, filed May 8, 2000.

BACKGROUND OF THE INVENTION

1. Field of the Invention

This invention relates generally to communication systems. More particularly, the invention relates to an improved architecture for implementing communication protocols such as the "Bluetooth" wireless protocol.

2. Description of the Related Art

Various combinations of hardware, firmware and software may be used to implement wireless and terrestrial communication protocol stacks. For example, referring to FIG. 1, the "Bluetooth" specification is comprised of several different protocol layers including a radio frequency ("RF") layer 160, a baseband layer ("BB") 150, a link control layer ("LC") 140, a link manager layer ("LM") 130, a logical link control and adaptation protocol layer ("L2CAP"), and a serial line emulation layer ("RFCOMM"). The functionality of each of these layers (as well as additional Bluetooth protocol layers) is described in detail in *Bluetooth Protocol Architecture*, Version 1.0 (Aug. 25, 1999) ("*Bluetooth Protocol Architecture*"), which can be found at "http://www-.Bluetooth.com."

Briefly, Bluetooth is a short-range radio standard intended to replace the cables connecting portable and fixed electronic devices. The standard, which operates in the unlicensed Industrial-Scientific-Medical ("ISM") band at 2.4 GHz, focuses on robustness, low complexity, low power, and low cost. Within the RF layer 160, a frequency hop transceiver is applied to combat interference and fading and a shaped, binary FM modulation is applied to minimize transceiver complexity. A symbol rate of 1 Ms/s, is maintained with a slotted channel having a nominal slot length of 625 ms. For full duplex transmission, a Time-Division Duplex ("TDD") scheme is used. Information is exchanged through data packets, with each packet being transmitted on a different hop frequency. A packet typically covers a single slot, but can be extended to cover up to five slots, depending on the application. Additional features of the Bluetooth standard are described in Jaap Haartsen, *Bluetooth—The Universal Radio Interface for ad hoc, Wireless Connectivity*, ERICSSON REVIEW No. 3, (1998).

As illustrated in FIG. 1, a Bluetooth integrated circuit ("IC") 106 is typically configured to implement the lower layers of the Bluetooth protocol stack (e.g., the RF 160, BB 150 LC 140 and LM 130 layers). The Bluetooth IC 106 in this example is typically an Application Specific Integrated Circuit ("ASIC"), a chip custom designed for a specific application (in this case the Bluetooth protocol). ASICs improve performance over general-purpose processors because ASICs are "hardwired" to do a specific job and do not incur the overhead of fetching and interpreting instructions stored in memory. As such, an ASIC chip typically performs an electronic operation as fast as it is possible to do so, providing that the circuit is efficiently designed.

The Bluetooth IC in FIG. 1 communicates with a host processor environment 105 through a host interface 107. The host processor environment 105 is typically comprised of a general purpose CPU (e.g., an Intel Pentium®-class processor) and software executed by the CPU (e.g., an operating system with an application programming interface ("API") and one or more application programs). As shown, in a typical configuration the host processor environment 105 is configured to support only the upper layers of the protocol stack, RF Comm 110, and L2CAP 120.

SUMMARY OF THE INVENTION

A software modem is described comprising: a finite state machine having a plurality of states interconnected through a plurality of events, wherein certain states and events in said plurality are implemented in software and other states and events in said plurality are implemented in hardware; and a scheduler communicatively coupled to the finite state machine and being programmable with one or more parameters defining scheduled operations to be performed by the scheduler, wherein the finite state machine is configured to select one or more of said parameters to be used by said scheduler upon transition by said finite state machine from a first state to a second state.

BRIEF DESCRIPTION OF THE DRAWINGS

A better understanding of the present invention can be obtained from the following detailed description in conjunction with the following drawings, in which:

FIG. 4 illustrates an exemplary look-up table which may be implemented in one embodiment of the invention.

DETAILED DESCRIPTION

Figure 1:
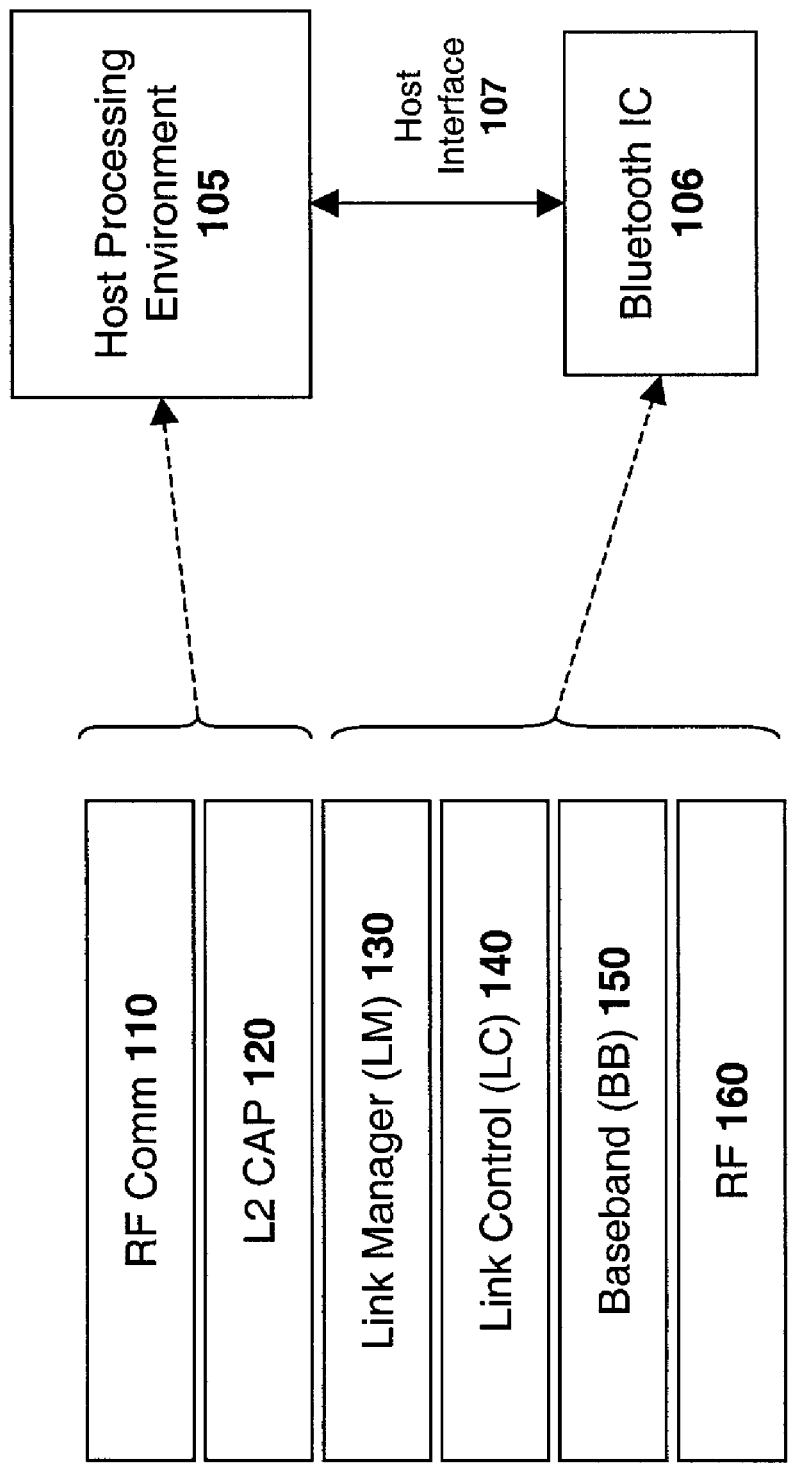
FIG. 1 illustrates a typical allocation of a Bluetooth protocol stack between a host processing environment and a Bluetooth IC.

In the following description, for the purposes of explanation, numerous specific details are set forth in order to provide a thorough understanding of the present invention. It will be apparent, however, to one skilled in the art that the present invention may be practiced without some of these specific details. For example, although embodiments of the invention are described below in the context of the "Bluetooth" standard, it should be noted that the underlying principles of the invention are not limited to any particular communication standard. For example, features of the invention may be performed in virtually any wireless or wireline network environment. Moreover, in some instances, well-known structures and devices are shown in block diagram form to avoid obscuring the principles of the invention.

Introduction

A system and method is described below which may be applied to a multitude of wireless and wireline protocols which, in general, rely on very fast, hard real-time responses within the physical or medium access control ("MAC") protocol layers. While this type of system and method is not always required for wireline modems such as V.90 (56 k) dialup modems, it is necessary for a Time Division Duplexing ("TDD") wireless protocol such as Bluetooth. One embodiment of the invention implements a software based modem on a host processor that does not respond to real-time events fast enough due, for example, to a slow link between the target hardware and the host processor (e.g. serial RS232), or the host processor running an OS that is non-real time (e.g. Windows). In addition, according to embodiments of the invention described herein, the software-based modem may be configured to process a larger portion of the protocol stack.

Moreover, embodiments of the invention described below provide increased flexibility by logically partitioning a protocol finite state machine ("FSM") between hardware and software. This property, combined with the programmable nature of the FSM, allows one to dynamically "fine-tune" the performance of the modem according to the capability of the host CPU. For example, with a relatively high-powered processor such as a 1 GHz CPU Pentium a larger number of slave devices may be handled in a piconet (i.e., when compared with slower CPU).

EMBODIMENTS OF THE INVENTION

Although ASICs improve performance over general-purpose CPUs for the reasons set forth above, they incur additional costs to the overall product when compared with software that may be executed by a general-purpose CPU and that may already exist for that product. As such, in some situations (e.g., for low-speed applications or applications which require only partial real-time support, or in situations where the host processor is fast enough to handle the necessary high-speed processing) it may be more efficient to offload the lower level protocol layers 130, 140, 150, and 160 from the Bluetooth IC to the host processing environment 105. This configuration will reduce the gate hardware requirement for the Bluetooth IC and thereby reduce overall product costs for adding Bluetooth capability to electronic devices that already require a host CPU.

Figure 2:
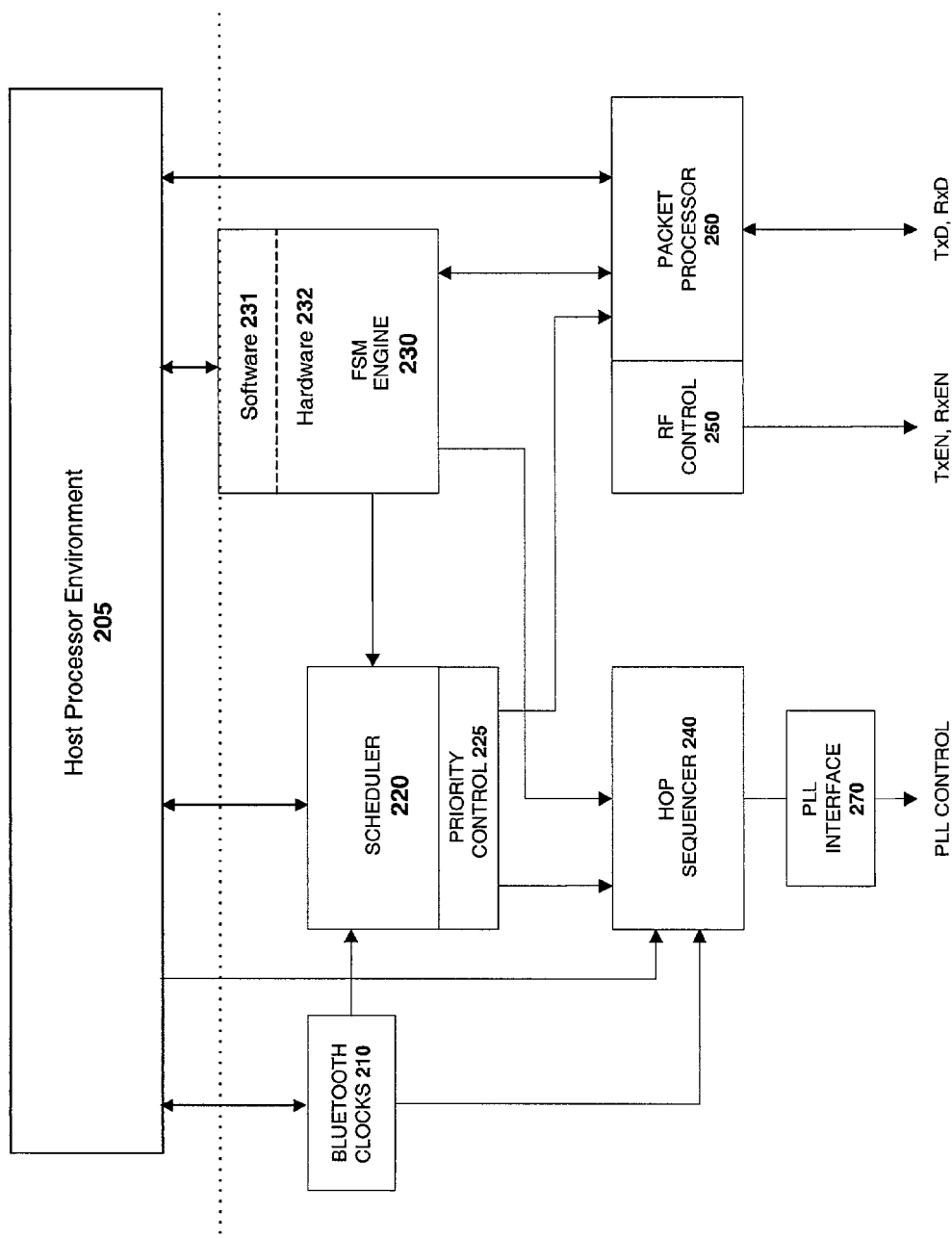
FIG. 2 illustrates a software modem architecture according to one embodiment of the invention.
Figure 10:
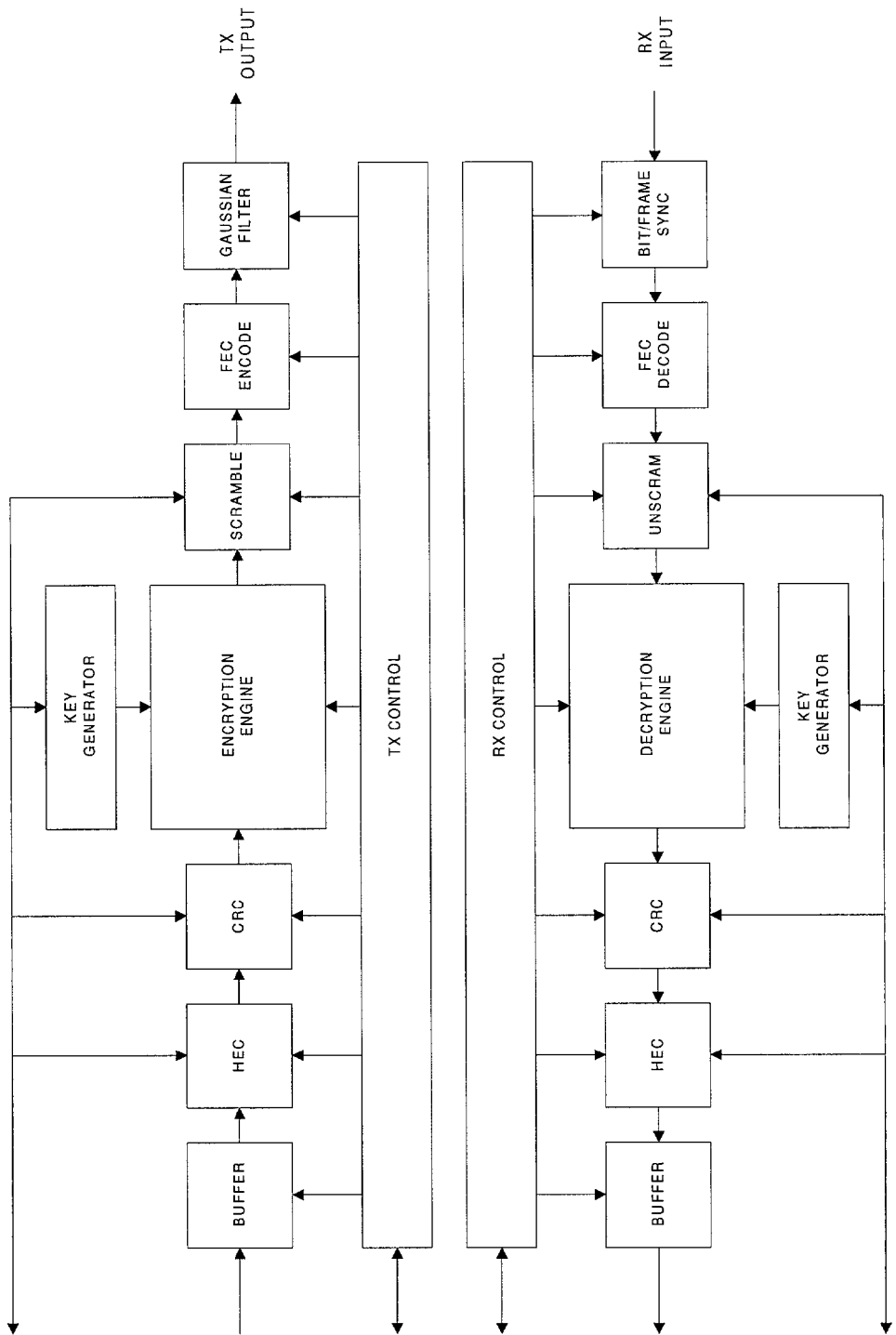
FIG. 10 illustrates a packet processor according to one embodiment of the invention.

One embodiment of a software modem, illustrated in FIG. 2, is comprised of a finite state machine ("FSM") engine 230; a scheduler unit 220 including a priority control unit 225; a hop sequencer 240 communicatively coupled to a phase locked loop ("PLL") unit through a PLL interface 270; one or more Bluetooth clocks 210 feeding a clock signal to the scheduler unit 220 and the hop sequencer 240; and an RF unit comprised of a packet processor 260 for receiving/transmitting ("TxD, RxD") incoming/outgoing data packets and a control unit 250 for controlling (e.g., enabling/disabling) the packet processor 260. FIG. 10 illustrates a packet processor 260 according to one embodiment of the invention.

FSM Engine

The FSM engine 230 of one embodiment provides a simple, efficient programming model for the baseband processor which allows baseband functions to be implemented using a limited number of gates in the baseband IC (and therefore provides a smaller IC footprint). More particularly, referring to FIGS. 3 and 4, which illustrate a state diagram 300 and a state look-up table 400 respectively, the FSM engine 230 is comprised of a series of baseband processor states 301–307 connected through a series of baseband processor events 310–318. In operation, when the baseband processor is operating in one state, e.g., state 302, for example, and detects an event 311, the processor will transition to state 305 and wait for the next event. In addition, as indicated in the look-up table 400, one or more baseband processor actions (e.g., Action B) may also be associated with a state/event pair.

As an example, at state 301 the baseband processor may listen for an incoming data packet; event 310 may be the receipt by the processor of an incoming data packet; and action 'A' taken by the processor may be a data packet transmission by the processor in response to the received data packet. Various other states, events and actions may be employed consistent with the underlying principles of the invention.

For time-critical applications such as real-time audio/video transmissions and other types of high-speed data applications, transitions from one state to another must be dealt with very quickly. By contrast, other types of applications such as wireless input devices (i.e., keyboards, mice, game controllers . . . etc) do not require the same level of high-speed event transitioning.

Figure 3:
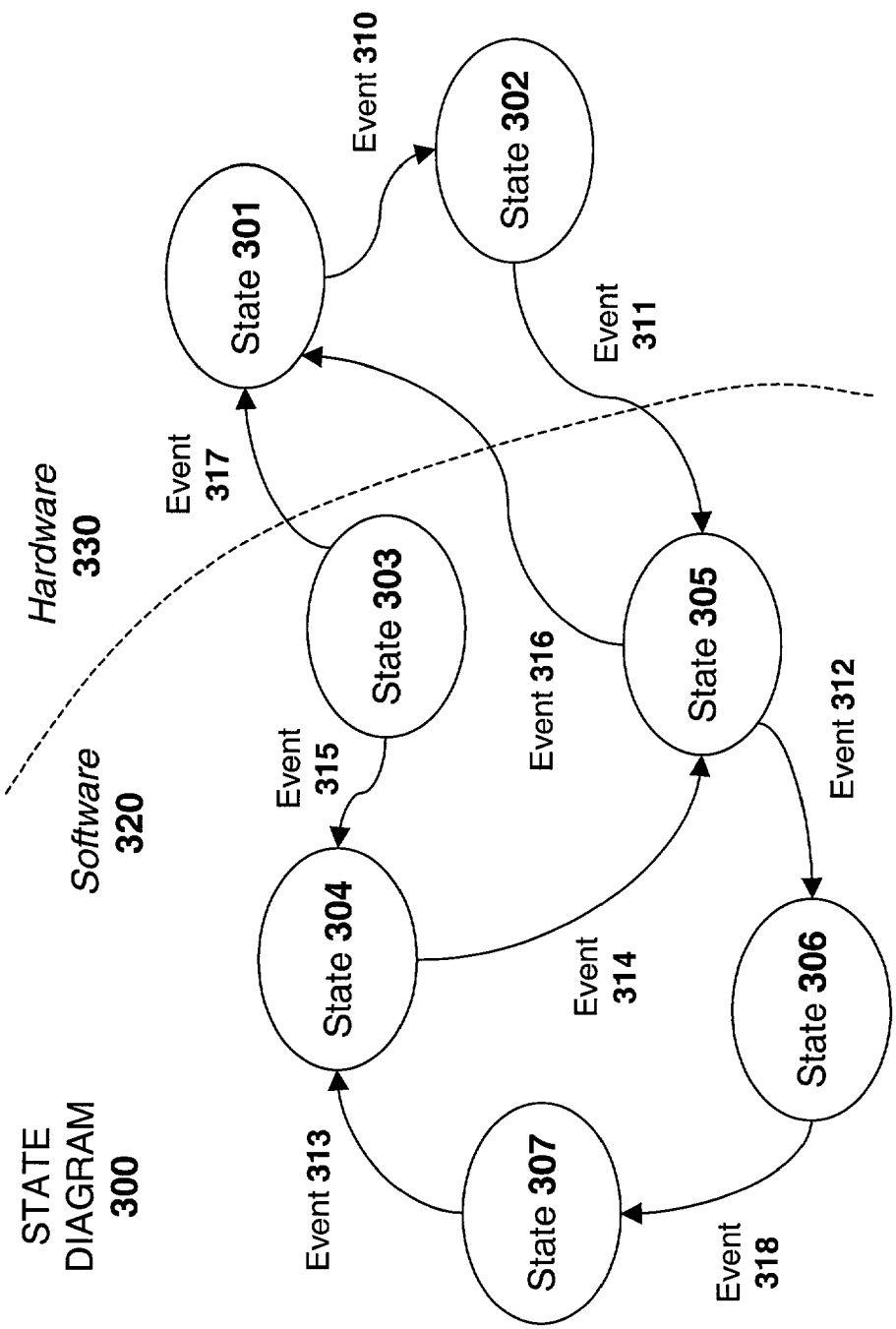
FIG. 3 illustrates a series of states and events allocated between hardware and software according to one embodiment of the invention.

In addition, in a communication protocol stack, some kind of FSM logic may be implemented in almost every layer to provide the required handshake and message exchange between two devices. As described previously, the real-timeliness of the transitions between states generally decreases as one goes up the protocol layers. At the same time, within each layer the response time requirements between different states also vary significantly depending on the particular design of the protocol. Accordingly, as illustrated in FIG. 3, for these different types of requirements, portions of the FSM engine 230 may be implemented using software 320 as well as hardware 330. In addition, it should be noted that even applications which require real-time/high-speed functionality may be implemented as described herein if the host processor is powerful enough. In one embodiment, the software component 320 is executed in the host processing environment 205 and the hardware component 330 is programmed in an ASIC. It should also be noted that portions of the state diagram 300 may exist at the link control ("LC") layer as well as the baseband layer.

Figure 9:
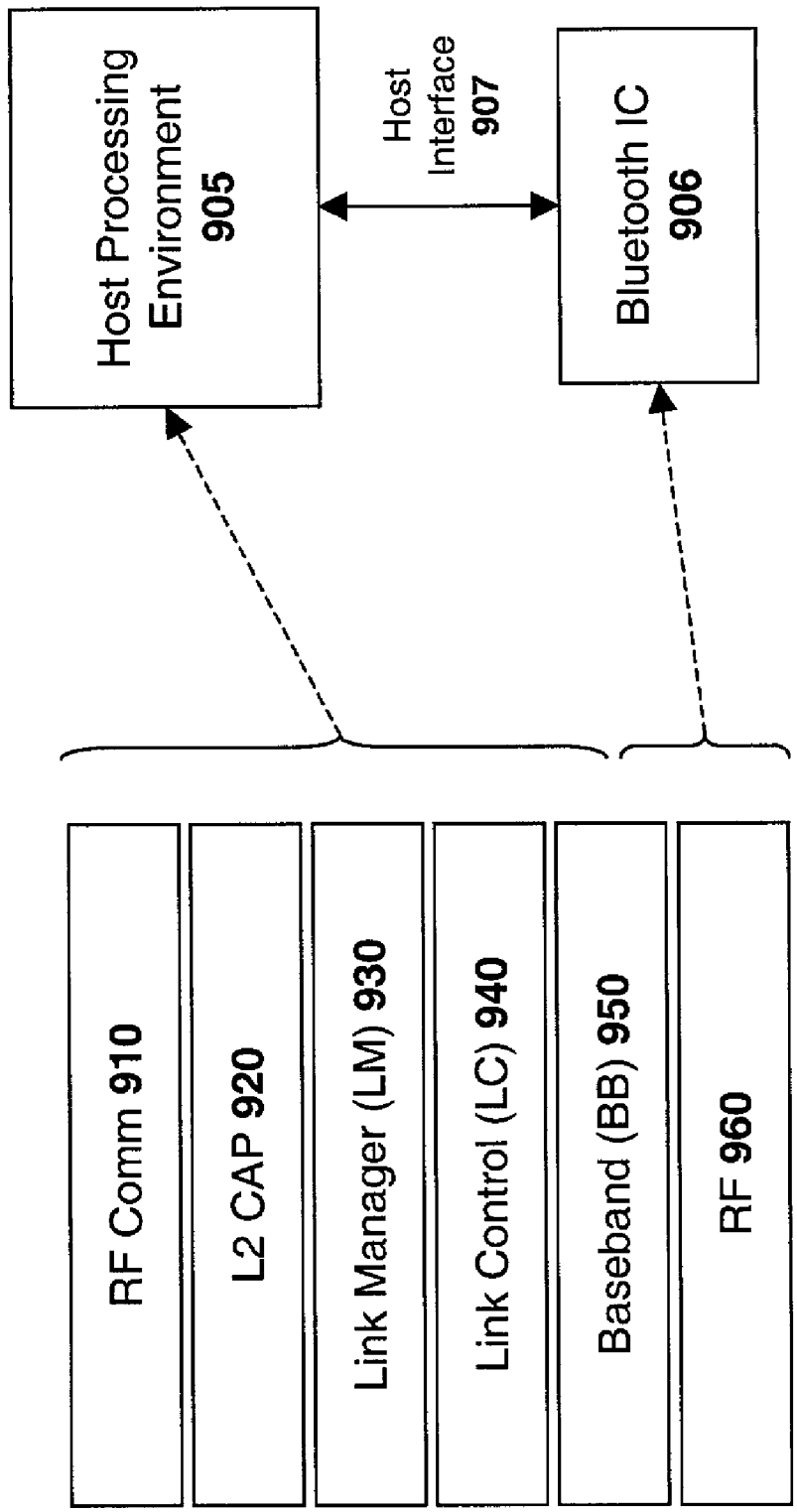
FIG. 9 illustrates protocol stack allocation according to one embodiment of the invention.

If the system is configured to support the Bluetooth protocol, the protocol stack may be divided as illustrated in FIG. 9, with the RF layer 960 and portions of the baseband layer 950 implemented in a Bluetooth IC 906 (which may be an ASIC) and the remaining layers, including certain portions of the baseband layer 150, implemented as software 320 executed in the host processor environment 905. In this embodiment, transitions between hardware states (e.g., state 302) and software states (e.g., state 305) will occur over the host interface 907.

Figure 5:
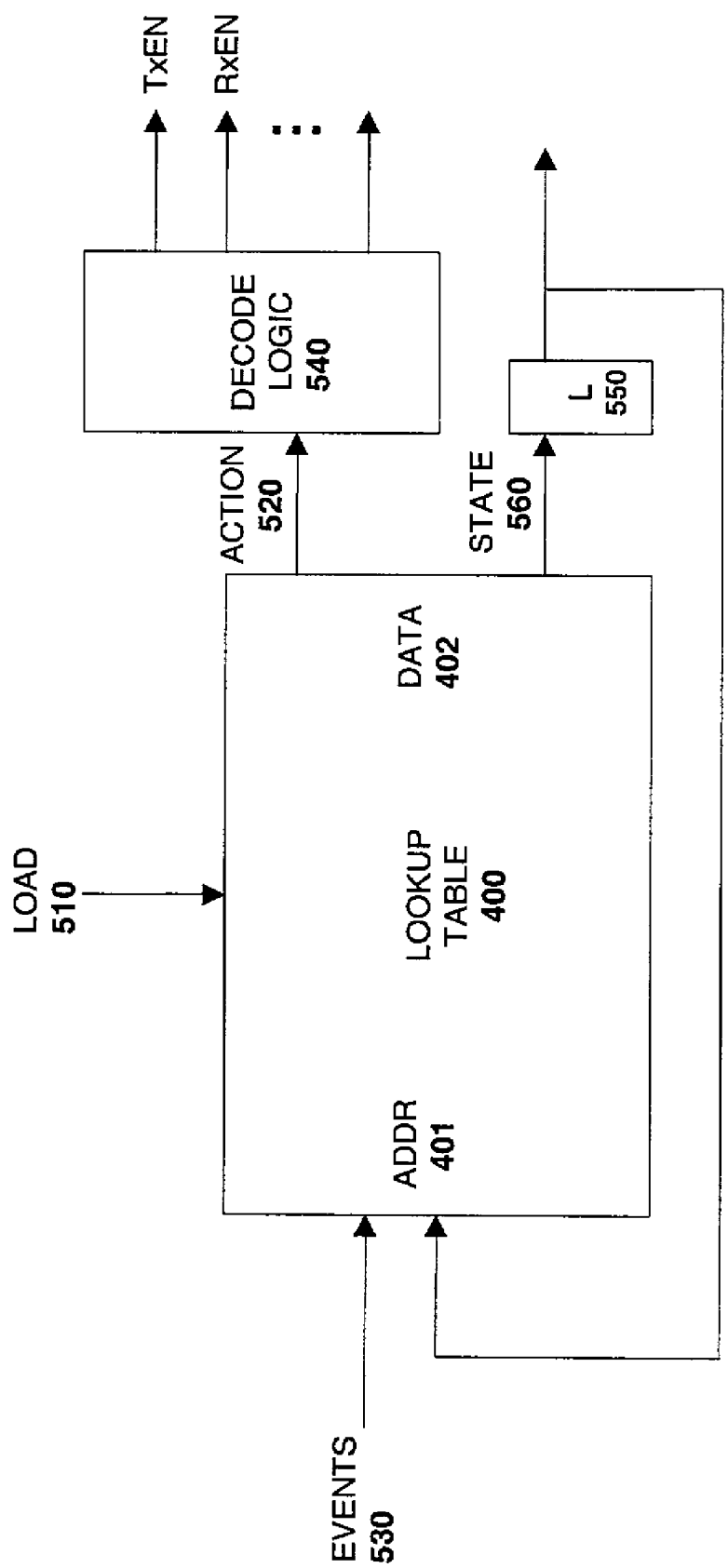
FIG. 5 illustrates a programmable finite state machine ("PFSM") engine implemented in one embodiment of the invention.

As illustrated in FIG. 5, one embodiment of an FSM engine 230 is comprised generally of a lookup table unit 400, a decode unit 540 and a latch 550. The lookup table unit 400 of one embodiment is comprised of a memory (not shown) for storing a lookup table such as the one illustrated in FIG. 4. The memory may be a volatile memory (e.g., random access memory or "RAM") or a non-volatile memory (e.g., an electrically erasable programmable read only memory or "EEPROM"; a programmable read only memory or "PROM", etc), depending on the particular embodiment. It should be noted, however, that the underlying principles of the invention may be implemented using virtually any type of memory capable of storing look-up table data. New look-up table data may be generated to support new applications and loaded/programmed into the memory in the look-up table unit 400 via the Load data path 510. The look-up table data in one embodiment is transmitted from the host processor environment 205 (via the load data path 510).

The FSM engine 230 of one embodiment also includes an address input 401 and a data output 402. New events 530 and the current state of the FSM engine 230 (stored in latch 550) are combined to form a look-up table address which is used by the FSM engine 230 to identify the next state 560 to which the FSM engine 230 will transition and/or the next action 520 which the FSM engine 230 will perform. The next state 560 may either be programmed in software or in hardware as described above. If programmed in software, the next state signal will be transmitted over the host interface 907 and processed in the host processing environment 905.

Upon transition to a new state, an action code 520 may be generated by the FSM engine 230. The action code is received by the decode logic unit 540, which produces a predefined action signal in response (e.g., such as transmit enable "TxEN" or receive enable "RxEN" as illustrated in FIG. 5). The action signals may be executed in the baseband layer 950 or, alternatively, may be transmitted down the protocol stack to the RF layer 960 or up the protocol stack to the link control layer 940, depending on the type of action required.

Scheduler

As illustrated in FIG. 2, one embodiment of the software modem also includes a scheduler unit 220 which operates in conjunction with the FSM engine 230. When implementing wireless/networking protocols (e.g., such as Bluetooth) there are typically predefined time periods during which certain actions must be taken (e.g., transmit packets, listen for packets, etc). The scheduler unit 220 provides a simple, efficient mechanism and programming model for supporting these types of timed, periodic actions.

Figure 7A:
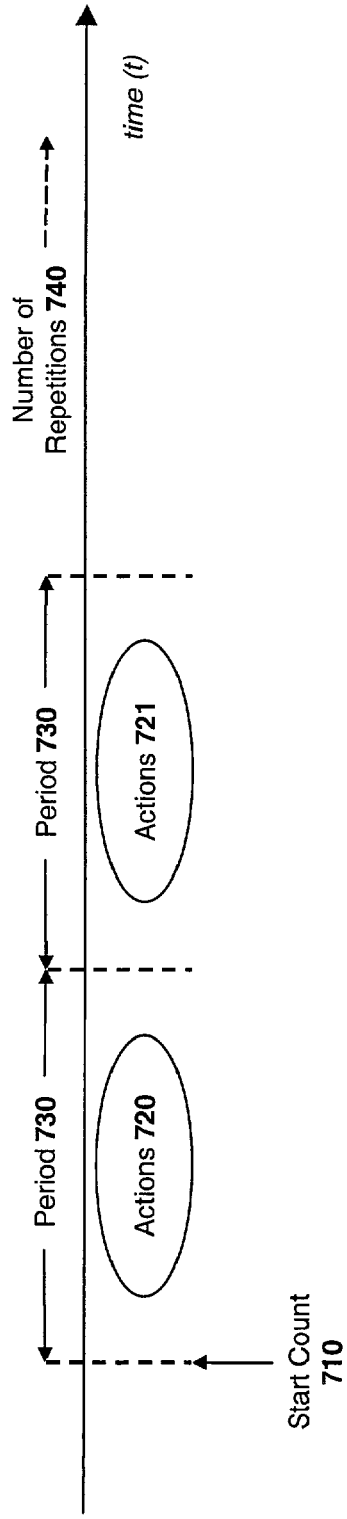
FIG. 7a illustrates an exemplary timing diagram according to one embodiment of the invention.
Figure 7B:
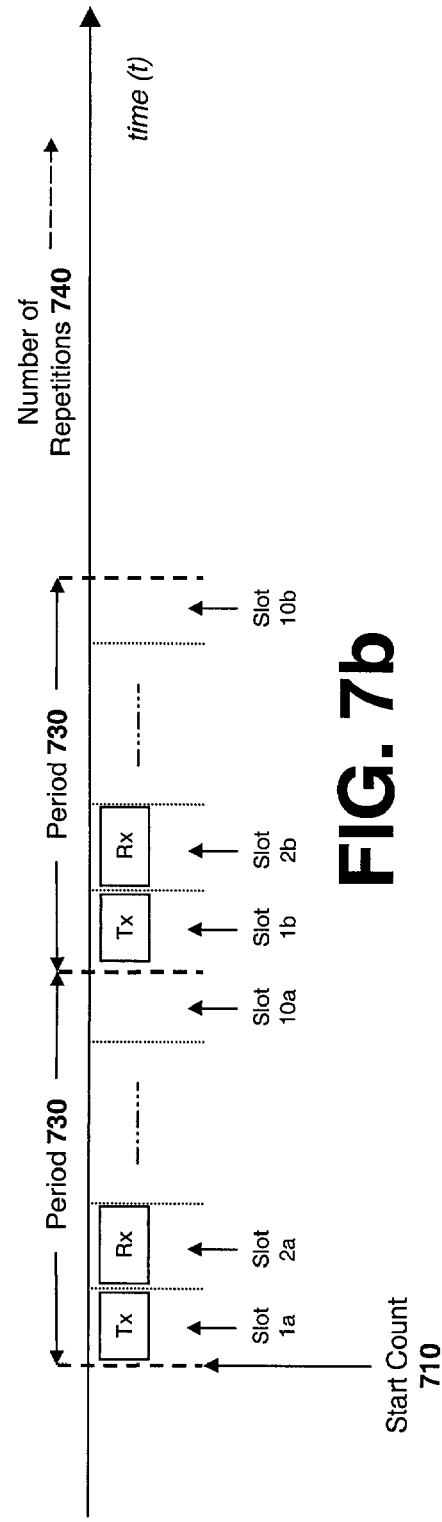
FIG. 7b illustrates another exemplary timing diagram according to one embodiment of the invention.

As illustrated in FIG. 7a, the host processor may offload operations to the scheduler unit 220 by specifying parameters including a start count value 710, a period 730, a repetition number 740, and one or more actions to be performed 720, 721. The start count 710 specifies a point in time when the scheduler unit 220 should begin executing a specified series of operations. The period 730 indicates the amount of time which should be allocated to perform one iteration of a particular set of actions 720, 721. For example, as illustrated in FIG. 7b, when implemented in a Bluetooth environment, the period 730 may be defined by a specified number of 625 us time slots (e.g., slots 1a–10a; 1b–10b; etc), with each slot representing a different action (e.g., transmit in slot 1a, receive in slot 2a), and a specified hop frequency.

The number of periods 730 to be executed by the scheduler unit 220 may be specified by a "number of repetitions" parameter 740. This value may be set to a definite number (e.g., 10) or, alternatively, may be set to an infinite value (i.e., execute until interrupted).

Figure 6:
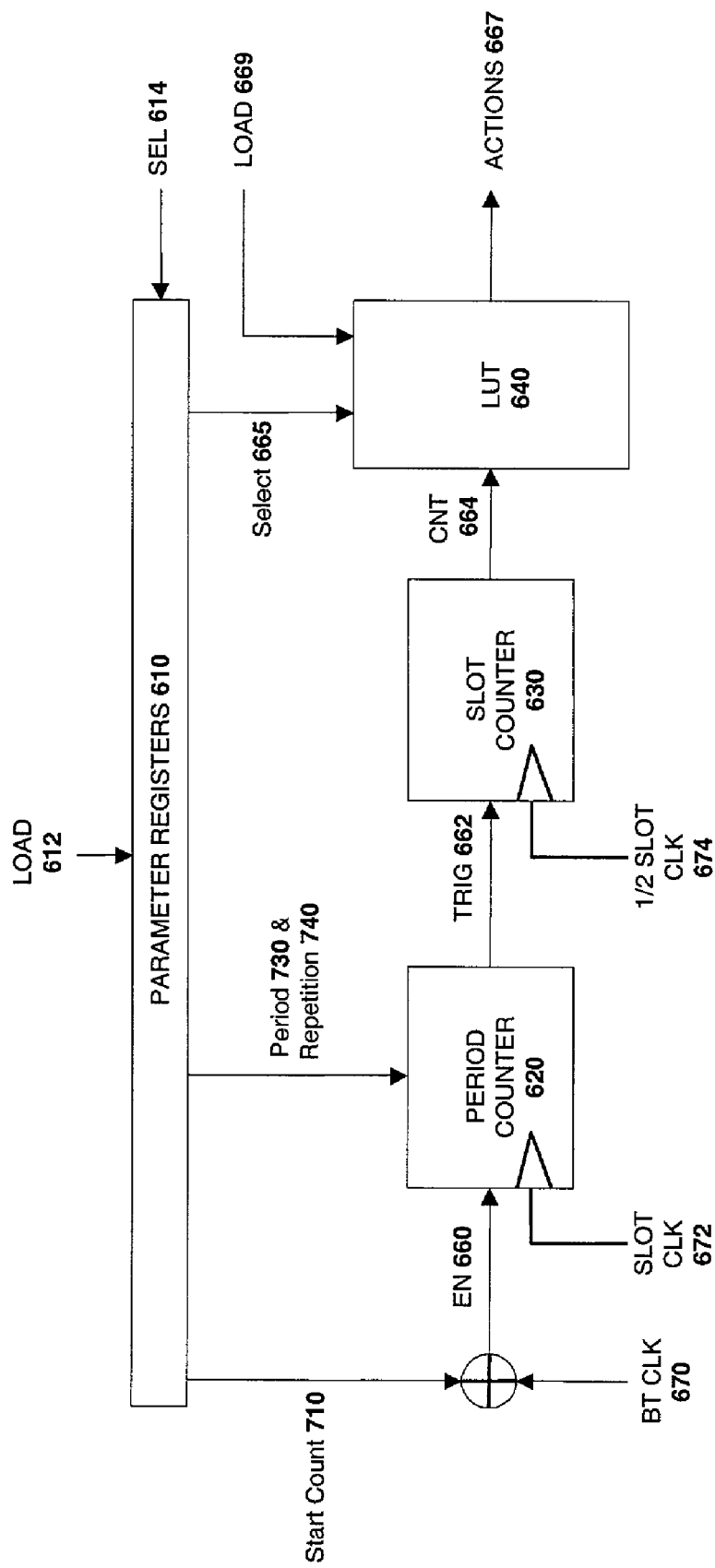
FIG. 6 illustrates a scheduler module implemented in one embodiment of the invention.

One particular embodiment of a scheduler unit 220 is illustrated in FIG. 6. This embodiment includes a set of parameter registers 610 for storing the various scheduler unit 220 parameters described above. New parameters may be loaded into the registers 610 via a load signal 612 originating from the host processor environment. Once the values are loaded, the FSM engine 230 may select a particular set of parameters via a select signal 614. In one embodiment, the select signal 614 transmitted to the scheduler unit 220 is defined by an FSM engine action 520 as described above.

In one embodiment, the scheduler 220 compares the start count value 710 to with a Bluetooth clock 670 to determine when to initiate the scheduled routine. As described above, each Bluetooth clock 670 operates on a specified frequency hop sequence. The scheduler unit 220 may identify a particular hop count within the hop sequence as the start count. Upon identification of the start count, an enable signal 660 is transmitted to the period counter 620. In one embodiment (e.g., in a Bluetooth environment) the slot clock 672, having a period of 625 us (i.e., a frequency of 1600 slots/sec), triggers the period counter 620. In response, the period counter 620 identifies the beginning and end of each period 730 based on the number of time slots counted (e.g., in FIG. 7b each "period" is equal to 10 time slots).

A trigger signal 662 having a period based on the slot clock 672 period is transmitted as an input to a slot counter 630 which identifies the beginning and end of each time slot. In a Bluetooth environment, the slot counter 630 triggers on a ½ slot clock 674 because this is the resolution required by the Bluetooth protocol. In response to the trigger signal 662 and the ½ slot clock signal 674, a binary control signal 664 is transmitted to a lookup table unit 640.

In one embodiment, the lookup table unit 640 uses the control signal 664 as an address to perform a lookup operation and determine the next action 667 to be executed. For example, referring once again to FIG. 7b, the scheduler unit 220 may generate a "transmit" command in the first slot of the period (e.g., slot 1a) based on a control signal of '0' and may generate a "receive" command in the second slot of the period (e.g., slot 1b) based on a control signal of '1.' It should be noted, however, that various more complex look-up addressing operations may be performed consistent with the underlying principles of the invention (e.g., using control addresses with multiple digits). New look-up tables may be loaded into a memory configured in the look-up table unit 640 via a load signal 669 and individual look-up tables may be selected by a table-select parameter 665 stored in one of the parameter registers 610.

Master Page—One Example of System Operation

Figure 8:
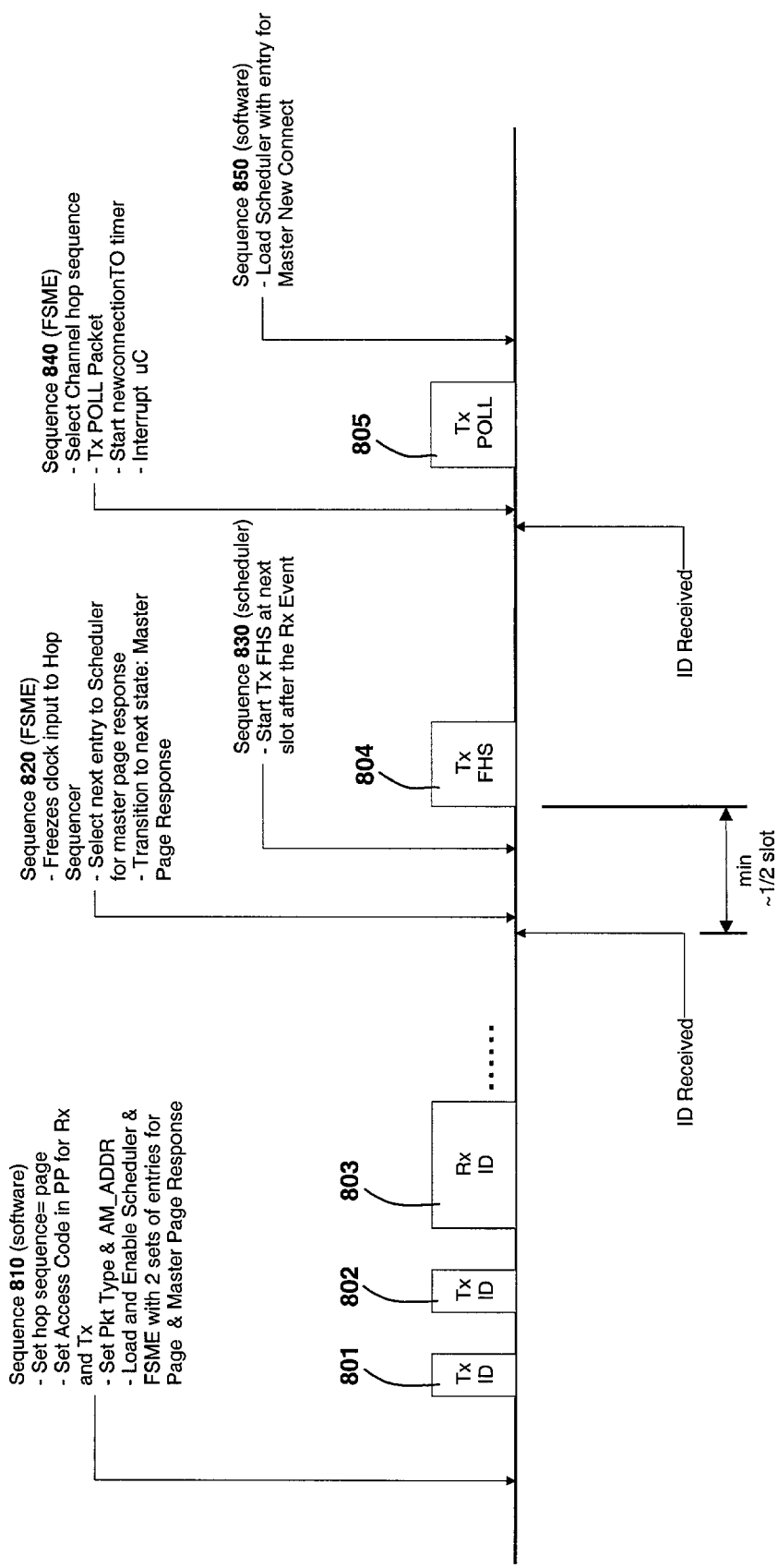
FIG. 8 illustrates a master page operation implemented according to one embodiment of the invention.

Interaction between the FSM engine 230, the scheduler unit 220 and the host processor environment 205 will now be described with reference to FIG. 8 which illustrates a Bluetooth page operation. Briefly, the page operation is used to establish communication between a "master" Bluetooth device and one or more "slave" devices. In the embodiment illustrated in FIG. 8 the initial sequence 810 of the page operation is performed by software executed in the host processor environment 205. The master device attempts to capture the slave device by transmitting pages which include the slave device's access code ("DAC") on different hop channels. Since the Bluetooth clocks of the master device and the slave device are not synchronized, the master device does not know exactly when the slave device wakes up and on which hop frequency. Therefore, it transmits a train of identical DACs at different hop frequencies, listening between the transmit intervals until it receives a response from the slave.

The master device also selects a packet type and an active member address code ("AM_ADDR"). The packet type identifies (among other things) the number of time slots the packet will occupy (up to five Bluetooth time slots may be occupied by a packet) and the AM_ADDR identifies active members of the local Bluetooth network (referred to as a "piconet") once a master-slave connection is established.

Thus, transmissions 801 and 802 which contain the DAC of the slave are transmitted on two different hop frequencies. In the following receive ("Rx") slot 803, the receiver listens sequentially to two corresponding Rx hops for an incoming packet with the slave DAC. The master device continues these transmissions at various hop frequencies until it receives a response from the slave (i.e., one which contains the slave's DAC).

When it receives such a transmission, the FSM engine 230 (at sequence 820) freezes the input to the hop sequencer. In addition, it transitions to a new state (a "master page response" state) and selects a new set of parameters (e.g., from the parameter registers 610) so that the scheduler unit 220 will execute the master device's page response.

At sequence 830, the scheduler unit 220 executes the response by transmitting an FHS packet 804 in the next slot following the Rx event. An FHS packet 804 is a special control packet transmitted in a single time slot which contains, among other things, the Bluetooth device's address and the clock of the master device. After the master device transmits the FHS packet 804, it waits for a second response from the slave device which acknowledges the reception of the FHS packet 804 with a packet containing the slave device's DAC.

At this point (see sequence 840) the FSM engine 230 selects a particular hop sequence referred to as the "channel hopping sequence," which uses all 79 hop channels in a random fashion. The master device may now send its first traffic packet in a hop frequency based on the new master parameters. As illustrated in FIG. 8, this first packet will be a POLL packet 805. The slave device is expected to respond to the POLL packet 805 with any type of data packet over the newly-generated master-slave channel. Finally, at sequence 850, the host processor loads the scheduler unit 220 with parameters for the new connection.

It is important to note that the apparatus and method described herein may be implemented in environments other than a physical integrated circuit ("IC"). For example, the circuitry may be incorporated into a format or machine-readable medium for use within a software tool for designing a semiconductor IC. Examples of such formats and/or media include computer readable media having a VHSIC Hardware Description Language ("VHDL") description, a Register Transfer Level ("RTL") netlist, and/or a GDSII description with suitable information corresponding to the described apparatus and method.

Throughout the foregoing description, for the purpose of explanation, numerous specific details were set forth in order to provide a thorough understanding of the invention. It will be apparent, however, to one skilled in the art that the invention may be practiced without some of these specific details. For example, while the embodiments described above focused on the Bluetooth protocol, the underlying principles of the invention may practiced using various other types of wireless and terrestrial protocols. Similarly, while the interaction between the scheduler unit 220, the FSM engine 230 and the host processor environment was described in the context of a master page operation, various other operations may be performed while complying with the underlying principles of the invention. Accordingly, the scope and spirit of the invention should be judged in terms of the claims which follow.

What is claimed is:

1. A method comprising:
   defining a protocol stack based on a plurality of states, events and actions, said events and actions defining transitions between each of said states;
   partitioning said plurality of states, events and action between hardware and software, based on a minimum defined performance criterion for said protocol stack; and
   moving said protocol stack from a first host environment to a second host environment;
   wherein said states, events and actions are repartitioned between hardware and software in said second host environment based on said second host environment's host processor capabilities.

2. The method as in claim 1 wherein said states, events and actions are configured using a look-up table.

3. The method as in claim 1 wherein transitions between states requiring a relatively higher response time are partitioned in hardware.

4. The method as in claim 1 wherein said protocol stack is a time-division duplexing ("TDD") wireless protocol.

5. The method as in claim 4 wherein said TDD wireless protocol is a Bluetooth protocol.

6. The method as in claim 1 wherein said hardware is an application-specific integrated circuit and said software is executed in a host processor environment.

7. A system comprising:
   a protocol stack operable to define a plurality of states, events, and actions, the events and actions defining transitions between each of said states, wherein the protocol stack is associated with a minimum defined performance criterion;
   a first host environment comprising a first set of hardware and a first set of software, wherein the first set of software and the first set of hardware are collectively operable to transition the first host environment between the states in accordance with a first partition that partitions the plurality of states, event, and actions between the first set of software and the first set of hardware based on the minimum defined performance criterion; and
   a second host environment comprising a second set of hardware and a second set of software, wherein the second set of software and the second set of hardware are collectively operable to transition the second host environment between the states in accordance with a second partition that partitions the plurality of states, event, and actions between the second set of software and the second set of hardware based on the minimum defined performance criterion.

8. The system of claim 7, wherein the first set of software and the first set of hardware are collectively operable to transition the first host environment between the states based on a first look-up table, and wherein the second set of software and the second set of hardware are collectively operable to transition the second host environment between the states based on a second look-up table.

9. The system of claim 7, wherein:
   the first partition partitions at least a portion of the states between the first set of software and the first set of hardware based on a response time associated with a transition between those particular states; and the second partition partitions at least a portion of the states between the second set of software and the second set of hardware based on a response time associated with a transition between those particular states.

10. The system of claim 7, wherein the protocol stack comprises a time-division duplexing ("TDD") wireless protocol.

11. The system of claim 10, wherein the TDD wireless protocol comprises a Bluetooth protocol.

12. The system of claim 7, wherein at least one of the first set of hardware and the second set of hardware comprises an application-specific integrated circuit.

* * * * *